(12) United States Patent
Adachi et al.

(10) Patent No.: US 7,714,787 B2
(45) Date of Patent: May 11, 2010

(54) ANTENNA, AND WIRELESS MODULE, WIRELESS UNIT AND WIRELESS APPARATUS HAVING THE ANTENNA

(75) Inventors: Satoshi Adachi, Yokohama (JP); Makoto Katagishi, Chigasaki (JP); Ikuo Murata, Yokohama (JP); Masumi Iwamura, Yokohama (JP); Ken Takei, Kawasaki (JP); Takahiro Sugiyama, Hitachi (JP); Yohei Shirakawa, Hitachi (JP)

(73) Assignees: Hitachi, Ltd., Tokyo (JP); Hitachi Media Electronics Co., Ltd., Iwate (JP); Hitachi Cable, Ltd., Tokyo (JP)

( * ) Notice: Subject to any disclaimer, the term of this patent is extended or adjusted under 35 U.S.C. 154(b) by 201 days.

(21) Appl. No.: 11/448,128

(22) Filed: Jun. 7, 2006

(65) Prior Publication Data

US 2006/0279469 A1 Dec. 14, 2006

(30) Foreign Application Priority Data

Jun. 7, 2005 (JP) ............................. 2005-166671

(51) Int. Cl.
*H01Q 1/24* (2006.01)
(52) U.S. Cl. ...................... 343/702; 343/850
(58) Field of Classification Search ................. 343/702, 343/850; 455/193.1
See application file for complete search history.

(56) References Cited

U.S. PATENT DOCUMENTS 3,209,358 A    9/1965 Felsenheld
5,745,844 A *  4/1998 Kromer et al. ........... 455/193.1
6,034,640 A    3/2000 Oida et al.
6,876,332 B1   4/2005 Chung et al.
2002/0044092 A1 4/2002 Kushihi
2002/0083458 A1* 6/2002 Henderson et al. ............. 725/72
2002/0167448 A1 11/2002 Kushihi et al.
2003/0156221 A1 8/2003 Oiwa
2004/0022295 A1 2/2004 Weulersse et al.
2005/0085204 A1 4/2005 Poilasne et al.

FOREIGN PATENT DOCUMENTS

EP    0 869 579 A1   10/1998
EP    1 256 998 A2   11/2002
EP    1 471 601 A1   10/2004
JP    2001-251131 A   9/2001

(Continued)

OTHER PUBLICATIONS

European Search Report issued in corresponding European Patent Application No. EP 06 25 2889, dated Sep. 7, 2006.

(Continued)

*Primary Examiner*—Douglas W Owens
*Assistant Examiner*—Dieu Hien T Duong
(74) *Attorney, Agent, or Firm*—McDermott Will & Emery LLP

(57) ABSTRACT

In an antenna that has high sensitivity to frequencies of narrow bands and over a wide band and that can be small-sized, and in a wireless module, wireless unit and wireless apparatus using this antenna, the antenna is comprised of a transmission line, and variable capacitance means connected to this transmission line, and the variable capacitance means controls the resonant frequency.

5 Claims, 19 Drawing Sheets

FOREIGN PATENT DOCUMENTS

JP 2002-330019 11/2002
JP 2005-167730 A 6/2005

OTHER PUBLICATIONS

European Search Report, issued in Corresponding European Patent Application No. 07016077.5-2220, dated on Oct. 18, 2007.

U.S. Office Action issued in U.S. Appl. No. 12/213,318, dated Jul. 20, 2009.
United States Office Action issued in the U.S. Appl. No. 12/213,318 dated Oct. 30, 2009.

* cited by examiner

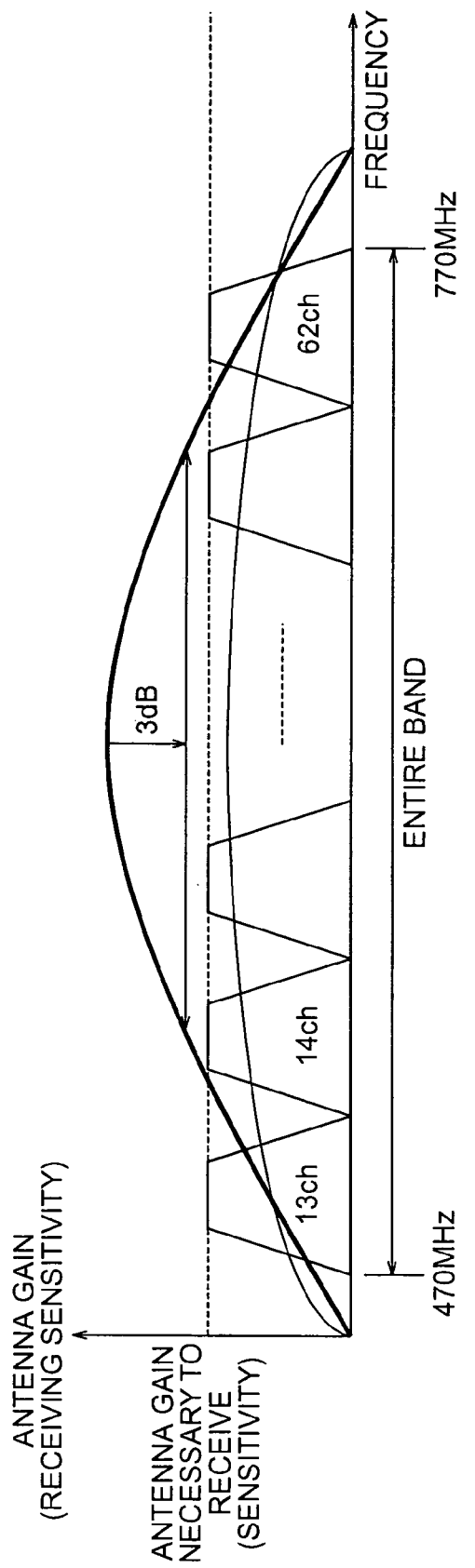

ANTENNA, AND WIRELESS MODULE, WIRELESS UNIT AND WIRELESS APPARATUS HAVING THE ANTENNA

INCORPORATION BY REFERENCE

The present application claims priority from Japanese application JP2005-166671 filed on Jun. 7, 2005, the content of which is hereby incorporated by reference into this application.

BACKGROUND OF THE INVENTION

The present invention relates to an antenna for use in wireless apparatus such as cellphone, personal computer and PDA and in a wireless module for that apparatus, and to a wireless module, wireless unit and wireless apparatus using the antenna.

The mobile television receiver has so far used the monopole antenna. However, according to a patent document of JP-A-2001-251131, the length of the monopole antenna is suppressed to about 60 cm in consideration of the usability of the mobile television receiver. In addition, the monopole antenna for the television receiver built in a portable terminal is further suppressed to a shorter length of about 20 cm.

SUMMARY OF THE INVENTION

However, the monopole antenna having about 20 cm in length as in the conventional mobile television receiver is still poor in its usability.

FIG. 19 is a diagram showing the antenna gain characteristic of the monopole antenna to the frequencies of the digital terrestrial television broadcasting in Japan.

The frequencies used for the ground wave digital television broadcasts in Japan range from 470 MHz to 770 MHz within the UHF band. The center frequency of the lowest channel is 473+1/7 MHz, and the interval between the center frequencies of the following channels is 6 MHz.

The monopole antenna has a relatively wide frequency band, but its receiving sensitivity is reduced as illustrated as the receiving frequency shifts away from the central frequency of the UHF band at which the receiving sensitivity is the highest. Thus, when the radio waves are tried to receive over the entire band from 470 MHz to 770 MHz, the receiving sensitivity is unavoidably reduced at both ends of the band, or at about 470 MHz and 770 MHz.

In addition, since the signals of the entire frequency band are entered into the receiving circuit, the undesired signals might act as waves that interfere with the desired signals, thus deteriorating the receiving characteristic.

Moreover, although the antenna is desired to house within the case like a built-in antenna for the purpose of usability, the built-in antenna has a narrower receiving band than the monopole antenna. Thus, it is used for a high-frequency narrow-band radio apparatus such as cellphone.

It is an objective of the invention to provide an antenna that can have a high receiving sensitivity over each of narrow bands and over a wide band and that can be small-sized, and a wireless module, wireless unit and wireless apparatus using this antenna.

According to this invention, there is provided an antenna that is comprised of a transmission line and variable capacitance means connected to this transmission line, and of which the resonant frequency is controlled by this variable capacitance means.

In this invention, the variable capacitance means may be a variable capacitance device using a switch or a variable capacitance diode.

In addition, the transmission line may be formed of an arbitrary number of transmission lines, namely, one transmission line or two transmission lines that constitute the antenna.

Moreover, according to the invention, there is provided an antenna that is comprised of a transmission line, a variable capacitance diode and a feed point. In this antenna, the variable capacitance diode has its one end, for example, anode electrically grounded and its other end, for example, cathode connected through the transmission line to the feed point. In addition, the resonant frequency of the antenna is controlled by the capacitance value of the variable capacitance diode that is also controlled by a DC reverse voltage.

In the antenna, the electrical length of the transmission line is λ/2 or less. When the variable capacitance diode is short-circuited, the input impedance viewing from the feed point toward the antenna becomes inductive at the frequencies of the frequency band used.

In addition, according to the invention, there is provided an antenna that is comprised of first and second transmission lines, a variable capacitance diode, a feed point and a control signal input terminal. In this antenna, the variable capacitance diode has its one end, for example, anode electrically grounded and its other end, for example, cathode connected through a resistor to the control signal input terminal and through the first transmission line to the feed point. Moreover, the feeder-end side end of the first transmission line is electrically grounded through the second transmission line. The resonant frequency is controlled by the capacitance value of the variable capacitance diode that is also controlled by the DC reverse voltage applied from the control signal input terminal.

In the above antenna, a capacitor is preferably connected between the variable capacitance means or the variable capacitance diode and the transmission line or the first transmission line.

In addition, according to the invention, there is provided an antenna that has first and second transmission lines, a variable capacitance diode, a resistor, a control signal input terminal and first and second capacitors. In this antenna, the variable capacitance diode has its one end, for example, anode electrically grounded and its other end, for example, cathode connected through the first transmission line and the resistor to the control signal input terminal. The resistor-side end of the first transmission line is electrically grounded through the second transmission line. The first capacitor is connected between the first transmission line side end of the resistor and the feed point. The second capacitor is connected at least either between the ground side end of the second transmission line and the ground or between the first transmission line side end of the second transmission line and the first transmission line. The resonant frequency is controlled by the capacitance value of the variable capacitance diode that is also controlled by the DC reverse voltage supplied from the control signal input terminal.

The transmission line or the first and second transmission lines of the antenna according to the invention are integrally formed on a printed circuit board on which a transmitting circuit and/or receiving circuit are to be mounted.

According to the invention, there is provided a wireless module that has at least the above antenna and the transmitting circuit and/or receiving circuit.

According to the invention, there is provided a wireless module that has at least an antenna and a transmitting circuit and/or receiving circuit, wherein the antenna is an arbitrary one of the antennas mentioned above, the transmitting circuit and/or receiving circuit includes a circuit for producing an antenna control signal, and the resonant frequency of the antenna to the transmitting signal/received signal is controlled by the antenna control signal produced from the transmitting circuit and/or receiving circuit.

In addition, according to the invention, there is provided a wireless module that has an antenna and a transmitting circuit and/or receiving circuit, wherein the antenna is an arbitrary one of the antennas mentioned as above, the transmitting circuit and/or receiving circuit includes a circuit for producing an antenna control signal, a central processing unit provided outside the wireless module controls the transmitting circuit and/or receiving circuit to set the frequency of a radio signal that the transmitting circuit and/or receiving circuit transmits/receives through the antenna, the central processing unit controls the transmitting circuit and/or receiving circuit to produce the antenna control signal that controls the resonant frequency of the antenna to the transmitting signal/received signal, and the frequency of the radio signal that the transmitting circuit and/or receiving circuit transmits/receives and the resonant frequency of the antenna to the transmitting signal/received signal are controlled in conjunction with each other.

In the wireless module mentioned above, the frequency band of any radio signal that the antenna transmits/receives is narrower than the entire frequency band used for a wireless system to transmit/receive radio signals through the antenna, and the central processing unit causes the resonant frequency of the antenna to change when any radio signal is transmitted or received, thus enabling the wireless system to transmit/receive radio waves over the entire frequency band for use.

According to the invention, there is provided a wireless unit that has an antenna and a transmitting circuit and/or receiving circuit connected through a coaxial cable, wherein the antenna is comprised of a transmission line and a variable capacitance diode, the variable capacitance diode has its one end, for example, anode electrically grounded and its other end, for example, cathode connected through the transmission line to one end of the coaxial cable, the transmitting circuit and/or receiving circuit has a circuit for supplying a DC reverse voltage to the other end of the coaxial cable, and the resonant frequency of the antenna is controlled by the capacitance value of the variable capacitance diode that is also controlled by the DC reverse voltage.

According to the invention, there is provided a wireless apparatus that has mounted thereon an arbitrary one of the wireless modules mentioned above.

According to the invention, there is provided a wireless apparatus that has mounted thereon the wireless unit mentioned above.

Moreover, according to the invention, there is provided a wireless apparatus that has mounted thereon a wireless module that has at least an antenna and a transmitting circuit and/or receiving circuit, wherein the antenna is an arbitrary one of the antennas mentioned above, the transmitting circuit and/or receiving circuit includes a circuit for producing an antenna control signal, and the resonant frequency of the antenna to the transmitting signal/received signal is controlled by the antenna control signal that the transmitting circuit and/or receiving circuit produces.

In addition, according to the invention, there is provided a wireless apparatus that has mounted thereon a wireless module that has at least an antenna, a transmitting circuit and/or receiving circuit and a central processing unit, wherein the antenna is an arbitrary one of the antennas mentioned above, the transmitting circuit and/or receiving circuit includes a circuit for producing an antenna control signal, the central processing unit controls the transmitting circuit and/or receiving circuit to set the frequency of a radio signal that the transmitting circuit and/or receiving circuit transmits/receives through the antenna, the central processing unit controls the transmitting circuit and/or receiving circuit to produce the antenna control signal that controls the resonant frequency of the antenna to the transmitting signal/received signal, and the frequency of the radio signal that the transmitting circuit and/or receiving circuit transmits/receives and the resonant frequency of the antenna to the transmitting signal/received signal are controlled in conjunction with each other.

In the wireless apparatus mentioned above, the frequency band of any radio signal that the antenna transmits/receives is narrower than the entire frequency band used for the wireless system to transmit/receive the radio signals through the antenna, and the central processing unit changes the resonant frequency of the antenna when any radio signal is transmitted/received, thus enabling the wireless system to transmit/receive the radio signals over the entire frequency band for use.

According to the invention, since the antenna is formed of a transmission line, the Q indicative of the sharpness of the resonance is high. In addition, the antenna has a resonant frequency determined by the capacitive component of the variable capacitance means and the inductance component of the inductive transmission line. Thus, the resonant frequency has a narrow frequency band. In addition, if the capacitive component of the variable capacitance means is changed to control the resonant frequency, the antenna can have high receiving sensitivity to each of narrow frequency bands and also over a wide frequency band.

In addition, when a particular resonant frequency is obtained, the capacitive component and inductive component of the transmission lines can be reduced by the capacitive component of the variable capacitance means as compared with the case where there is no variable capacitance means. Thus, since the capacitive component and inductive component of the transmission lines are proportional to the tangent of their lengths, the transmission line lengths can be reduced, and thus a small-sized antenna can be produced.

Other objects, features and advantages of the invention will become apparent from the following description of the embodiments of the invention taken in conjunction with the accompanying drawings.

BRIEF DESCRIPTION OF THE DRAWINGS

FIG. 18 indicates that the receiving unit of FIG. 10 is replaced with the transmitting and receiving module of FIG. 14.

FIG. 19 is a diagram showing the antenna gain characteristic of the monopole antenna to the frequencies of the digital terrestrial television broadcasting in Japan.

DETAILED DESCRIPTION OF THE EMBODIMENTS

Figure 1:
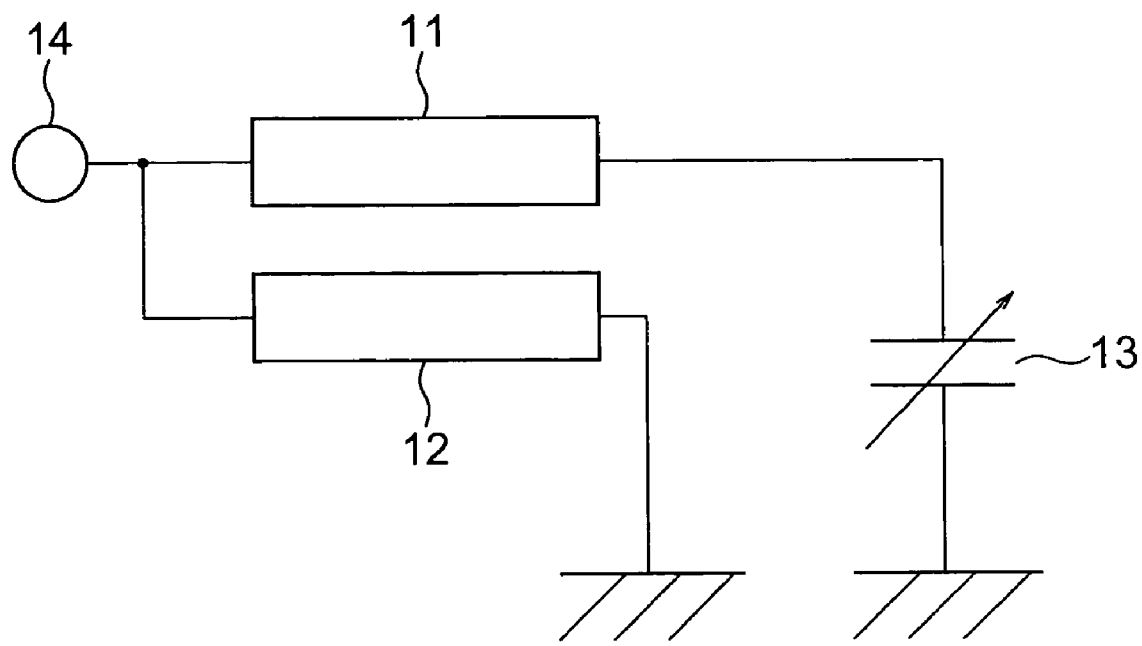
FIG. 1 is a diagram showing an example of the fundamental structure of an antenna according to the first embodiment of the invention.

FIG. 1 is a diagram showing an example of the fundamental structure of an antenna according to the first embodiment of the invention. Referring to FIG. 1, the transmission line is formed of two transmission lines 11 and 12. The antenna is comprised of the two transmission lines 11, 12 of λ/4 or less electric wavelength, variable capacitance means 13 and feed point 14.

One end of the variable capacitance means 13 is electrically grounded, and the other end is connected to one end of the transmission line 11. The other end of the transmission line 11 is connected to the feed point 14 and to one end of the transmission line 12. The other end of the transmission line 12 is electrically grounded. The resonant frequency is controlled by the capacitance change of the variable capacitance means 13. When the variable capacitance means 13 has its capacitance changed by a switch, the resonant frequency is controlled by the operation of the switch. When the variable capacitance means 13 is a variable capacitance diode, the resonant frequency is controlled with the capacitance value of the variable capacitance diode which is controlled by a DC reverse voltage.

Since this antenna is formed of λ/4 or less electrical length transmission lines, the Q indicative of the sharpness of the resonance is high.

Figure 2:
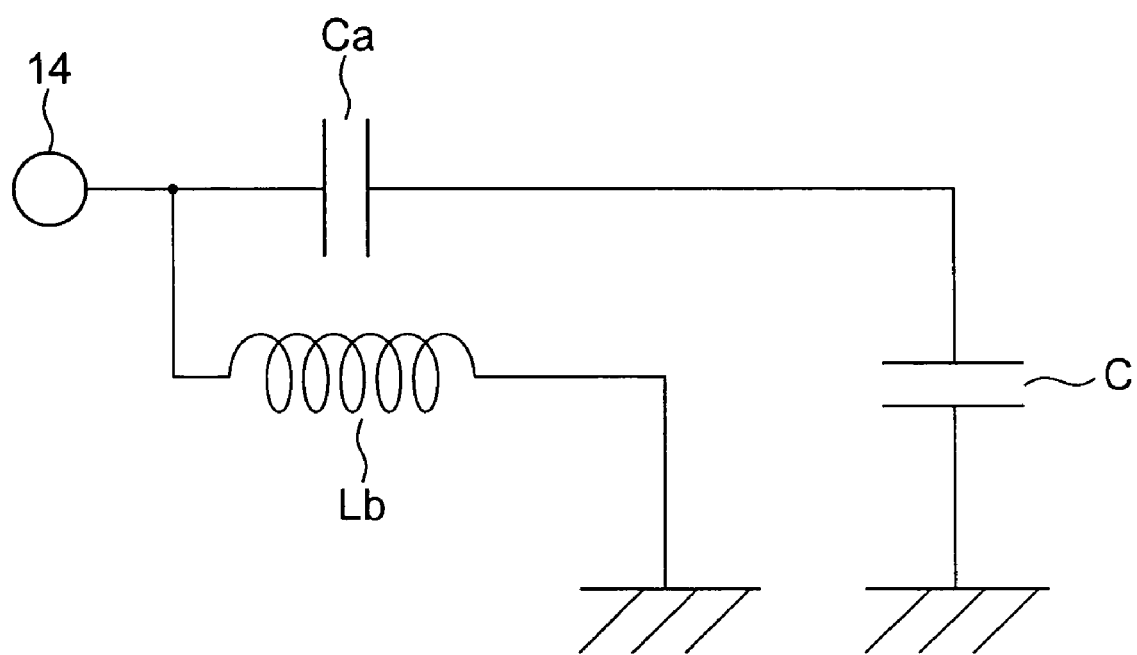
FIG. 2 is a diagram showing the equivalent circuit of the structure shown in FIG. 1 that is derived from the lumped constants of the antenna.

FIG. 2 shows the equivalent circuit estimated from the lumped constants of the antenna shown in FIG. 1.

In FIG. 2, the transmission line 11 shown in FIG. 1 is expressed by a capacitive component Ca, the transmission line 12 by an inductance component Lb, and the variable capacitance diode 13 by a capacitive component C.

In order to resonate this antenna at a frequency, it is necessary that, when the variable capacitance diode is short-circuited across itself, the input impedance at this frequency as viewing from the feed point 14 toward the antenna be inductive. If the input impedance is inductive at this time, the imaginary component of the input impedance becomes zero at a certain frequency when the variable capacitance diode is connected, and this antenna is sure to resonate.

This fact is applied to the equivalent circuit shown in FIG. 2. The resonant frequency f to make the imaginary component of the input impedance zero is calculated as follows.

$$f = \frac{1}{2\pi\sqrt{Lb \cdot C'}} \quad (1)$$

$$C' = \frac{C \cdot Ca}{C + Ca} \quad (2)$$

The resonant frequency is determined by Lb, Ca and C, and thus it can be controlled by changing the capacitive component C of variable capacitance diode 13.

Thus, the receiving band of the antenna can be made narrower than the entire frequency band used by the digital terrestrial television broadcasting, or it can be set to be, for example, 8 MHz. In addition, the resonant frequency of the antenna as the receiving center can be controlled to change by changing the capacitive component of the variable capacitance means.

While the one end of the transmission line 12 of the antenna shown in FIG. 1 is grounded, it may be opened, or made as an open stub. In that case, the electric length of the transmission line 12 is made λ/2 or less.

Figure 3:
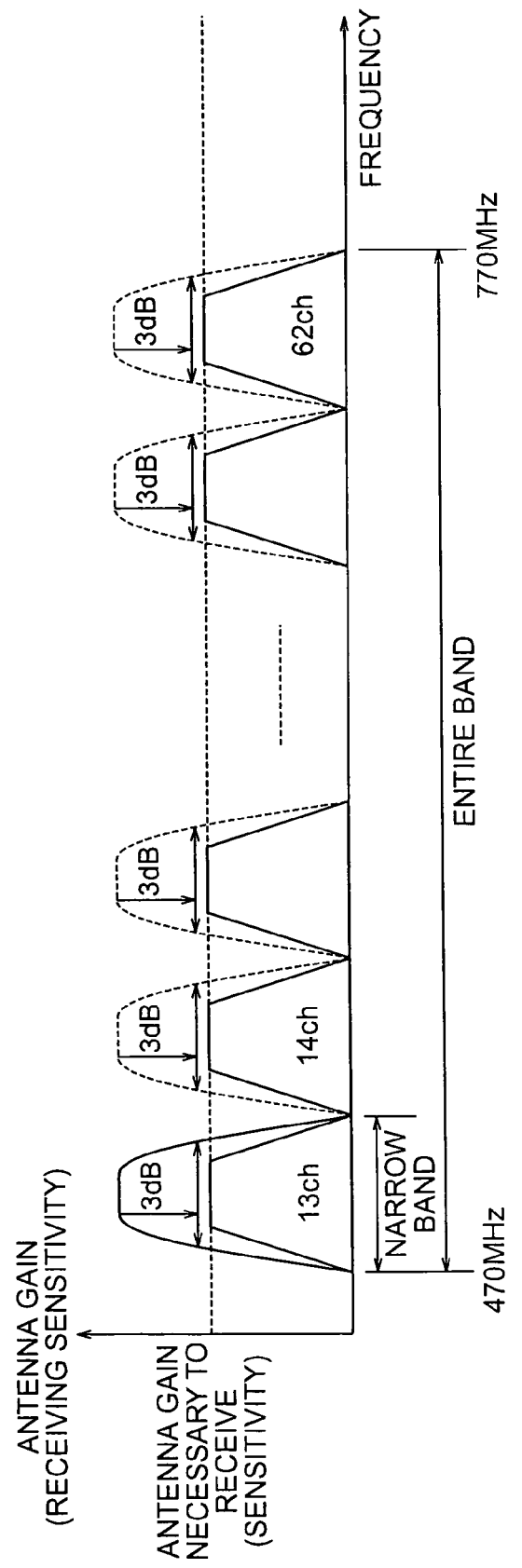
FIG. 3 is a diagram showing the antenna gain characteristic of the antenna according to the invention with respect to the frequencies of the digital terrestrial television broadcasting in Japan.

FIG. 3 shows the antenna gain characteristic of the antenna according to the invention with respect to the frequencies of the digital terrestrial television broadcasting in Japan.

The antenna according to the invention has an excellent receiving sensitivity over the entire UHF band from 470 MHz to 770 MHz, particularly at both ends of the band, or around 470 MHz and 770 MHz.

In addition, when a particular resonant frequency is obtained, the capacitive component Ca and inductive component Lb of the transmission lines can be reduced depending on the capacitive component C of the variable capacitance means 13. Since the capacitive component and inductive component of the transmission lines are proportional to the tangent of the lengths, the lengths of the transmission lines can be reduced, and thus it is possible to produce a small-sized antenna.

Moreover, in order to establish the better matching condition at the feed point 14 in FIG. 1, it is necessary to adjust both the imaginary component and real component of the input impedance. According to this construction, since the two parameters of transmission lines 11, 12 exist, matching of the antenna and the feed point 14 can be satisfactorily made. Thus, a high-sensitivity antenna can be produced.

Figure 4:
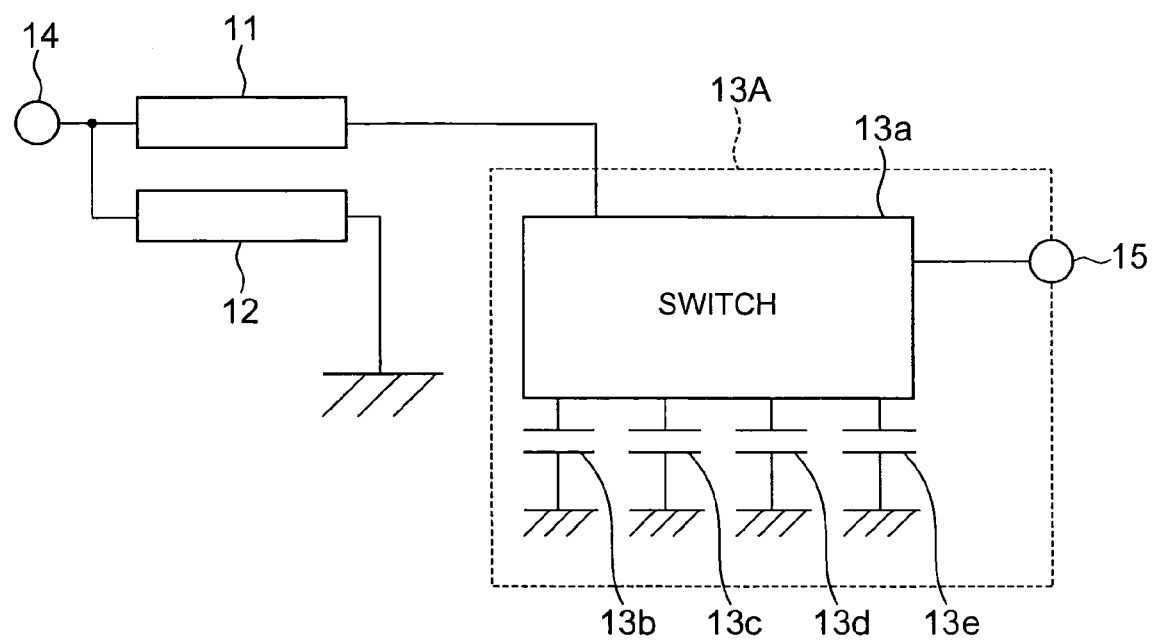
FIG. 4 is a diagram showing the structure of an antenna according to the second embodiment of the invention.

FIG. 4 is a diagram showing the structure of an antenna according to the second embodiment of the invention. In FIG. 4, like elements corresponding to those in FIG. 1 are identified by the same reference numerals. As illustrated in FIG. 4, the antenna is comprised of the transmission lines 11, 12, a variable capacitance device 13A with a switch, the feed point 14 and a control signal input terminal 15. Here, the variable capacitance means 13 shown in FIG. 1 is replaced by the switch-attached variable capacitance device 13A.

The switch-attached variable capacitance device 13A is comprised of a switch circuit 13a and first to fourth capacitors

13b, 13c, 13d and 13e. The switch circuit 13a is controlled by a control signal inputted through the control signal input terminal 15 so that an arbitrary one or ones of the capacitors can be selected and connected to the transmission line 11.

Here, the first to fourth capacitors may have an equal value or different values. If they have different values, 16 stepwise capacitance values can be obtained by selecting arbitrary ones of the four capacitors.

The control signal can be applied by the following methods. In one method, control signal lines of which the number corresponds to that of the capacitors are provided, and control signals of ON or OFF are respectively transmitted on the control signal lines. In another method, a digital signal of a plurality of bits is transmitted on a single signal line to make each capacitor on or off in accordance with 0 or 1 of each bit. In still another method, the switch circuit 13a is previously set so that the capacitors to be selected can be respectively associated with the voltage values supplied through the control signal input terminal 15, and a continuously changing voltage is applied as the control signal to the input terminal.

While four capacitors are used in this embodiment, two or more capacitors may be used.

Figure 5:
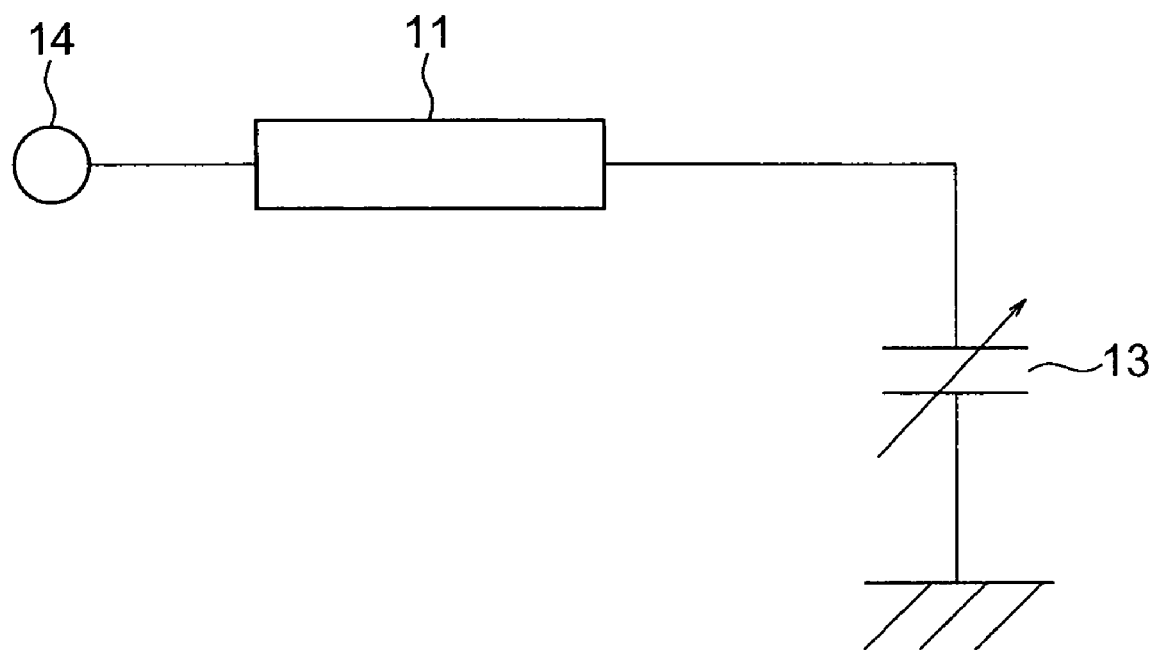
FIG. 5 is a diagram showing the structure of an antenna according to the third embodiment of the invention.

FIG. 5 is a diagram showing the construction of an antenna according to the third embodiment of the invention. In FIG. 5, like elements corresponding to those in FIG. 1 are identified by the same reference numerals. As illustrated in FIG. 5, the transmission line is formed of a single transmission line 11 and the antenna is comprised of the transmission line 11 of λ/2 or less electrical length, the variable capacitance means 13 and the feed point 14.

One end of the variable capacitance means 13 is electrically grounded, and the other end is connected to one end of the transmission line 11. The other end of the transmission line 11 is connected to the feed point 14. The resonant frequency is controlled by the capacitance value of the variable capacitance means 13.

Figure 6:
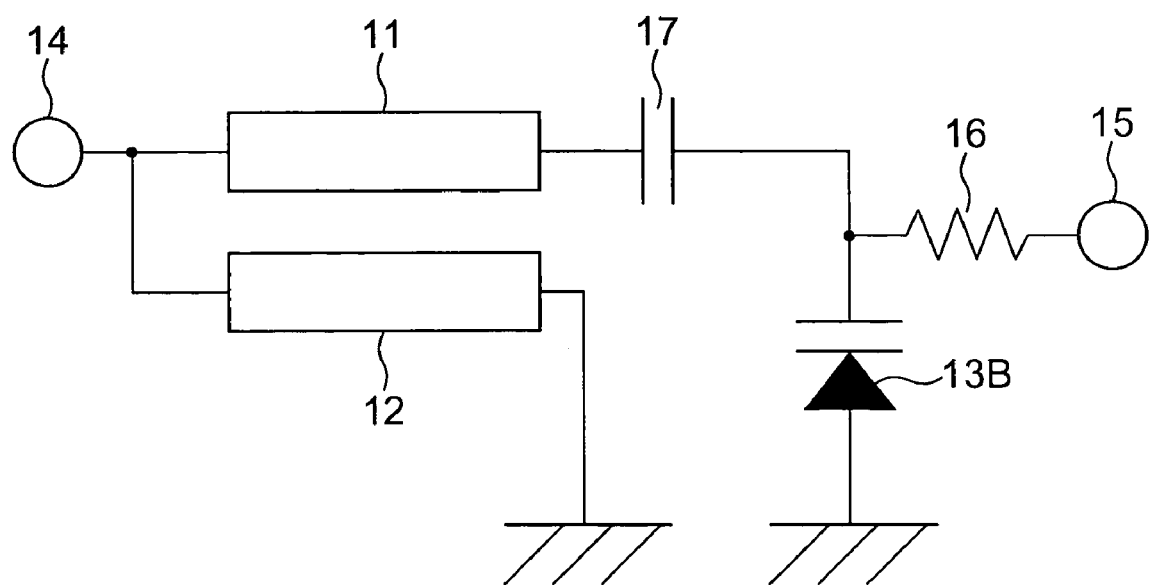
FIG. 6 is a diagram showing the structure of an antenna according to the fourth embodiment of the invention.

FIG. 6 is a diagram showing the construction of an antenna according to the fourth embodiment of the invention. In FIG. 6, like elements corresponding to those in FIG. 1 are identified by the same reference numerals. Here, the variable capacitance means 13 shown in FIG. 1 is replaced by a variable capacitance diode 13B, and a resistor 16 and a capacitor 17 are added.

As illustrated in FIG. 6, the variable capacitance diode 13B has its anode electrically grounded and its cathode connected to one end of the resistor 16, and the other end of resistor 16 is connected to the control signal input terminal 15.

In addition, the cathode of the variable capacitance diode 13B is connected to one end of the capacitor 17, and the other end of the capacitor 17 is connected to one end of the transmission line 11. The other end of the transmission line 11 is connected to the feed point 14 and to one end of the transmission line 12. The other end of the transmission line 12 is electrically grounded. Moreover, as illustrated in FIG. 6, the capacitor 17 is connected between the transmission line 11 and the variable capacitance diode 13B.

To the control signal input terminal 15 is supplied a DC reverse voltage from the outside of the antenna in order to control the capacitance value of the variable capacitance diode 13B. The DC reverse voltage controls the capacitance value of variable capacitance diode 13B, and thus the capacitance value of variable capacitance diode 13B controls the resonant frequency.

In this embodiment, in addition to the various effects mentioned with reference to FIG. 1, the capacitor 17 inserted between the transmission line 11 and the variable capacitance diode 13B blocks the DC current from flowing from the variable capacitance diode 13B to the transmission line 11 so that the received signal with the DC voltage suppressed to zero can be led out from the feed point 14.

Figure 7:
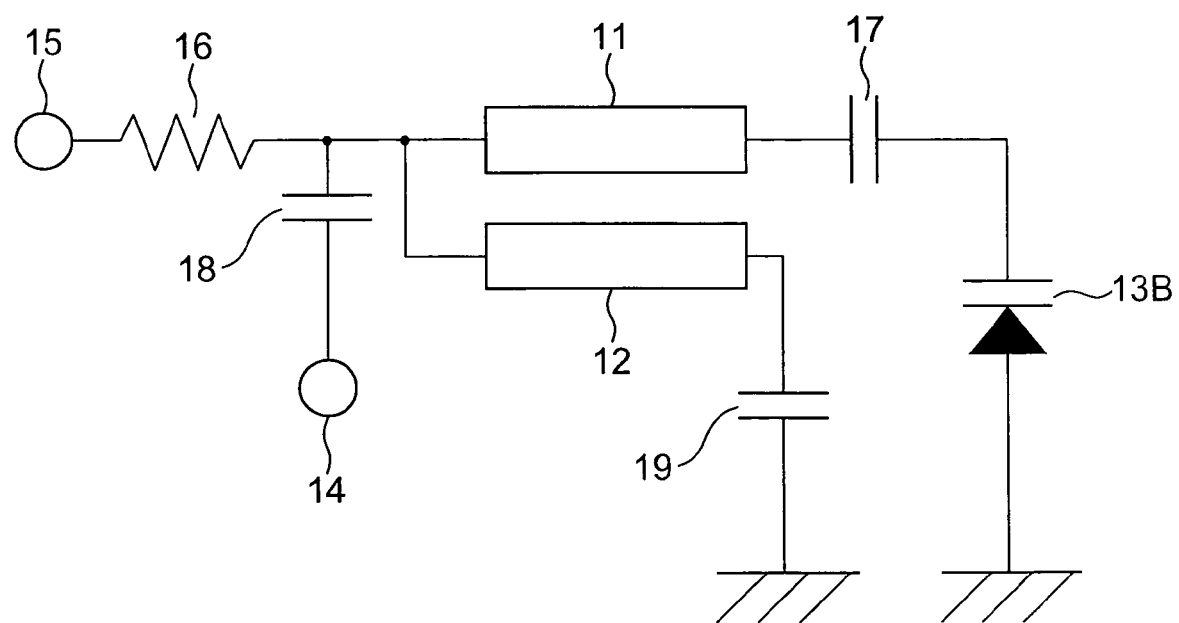
FIG. 7 is a diagram showing the structure of an antenna according to the fifth embodiment of the invention.

FIG. 7 is a diagram showing the construction of an antenna according to the fifth embodiment of the invention. In FIG. 7, like elements corresponding to those in FIG. 6 are identified by the same reference numerals.

As shown in FIG. 7, the variable capacitance diode 13B has its anode electrically grounded and its cathode connected to one end of the transmission line 11. The other end of the transmission line 11 is connected to one end of the resistor 16, and the other end of the resistor 16 is connected to the control signal input terminal 15.

The other end of the transmission line 11 is also connected to one end of a capacitor 18, and the other end of the capacitor 18 is connected to the feed point 14. The other end of the transmission line 11 is also connected to one end of the transmission line 12, and the other end of the transmission line 12 is electrically grounded through a capacitor 19.

The DC reverse voltage supplied from the control signal input terminal 15 through the resistor 16 and transmission line 11 controls the capacitance value of the variable capacitance diode 13B, and thus controls the resonant frequency.

In this embodiment, in addition to the various effects mentioned with reference to FIG. 1, the capacitor 18 blocks the DC current from flowing to the feed point 14 so that the received signal with the DC voltage suppressed to zero can be led out. Moreover, since the capacitors 18 and 19 block the DC current from flowing to the ground, the DC voltage supplied from the control signal input terminal 15 can be directly fed to the variable capacitance diode 13B.

In addition, this embodiment is different from the embodiment shown in FIG. 6 in that the feed point 14 and control signal input terminal 15 are both provided on one side of the transmission lines 11 and 12, thus making it easy to connect this antenna and the following circuits.

A wireless module and wireless apparatus having the antenna according to this invention will be described next.

First, description will be made of an example of the application of a wireless module to a digital terrestrial television broadcast receiving apparatus incorporated in a portable terminal. This wireless module includes an antenna according to this invention and the following receiving circuits. Although only the receiving operation will be mentioned, the same operation is also performed for the application of this invention to the transmitting circuit.

Figure 8:
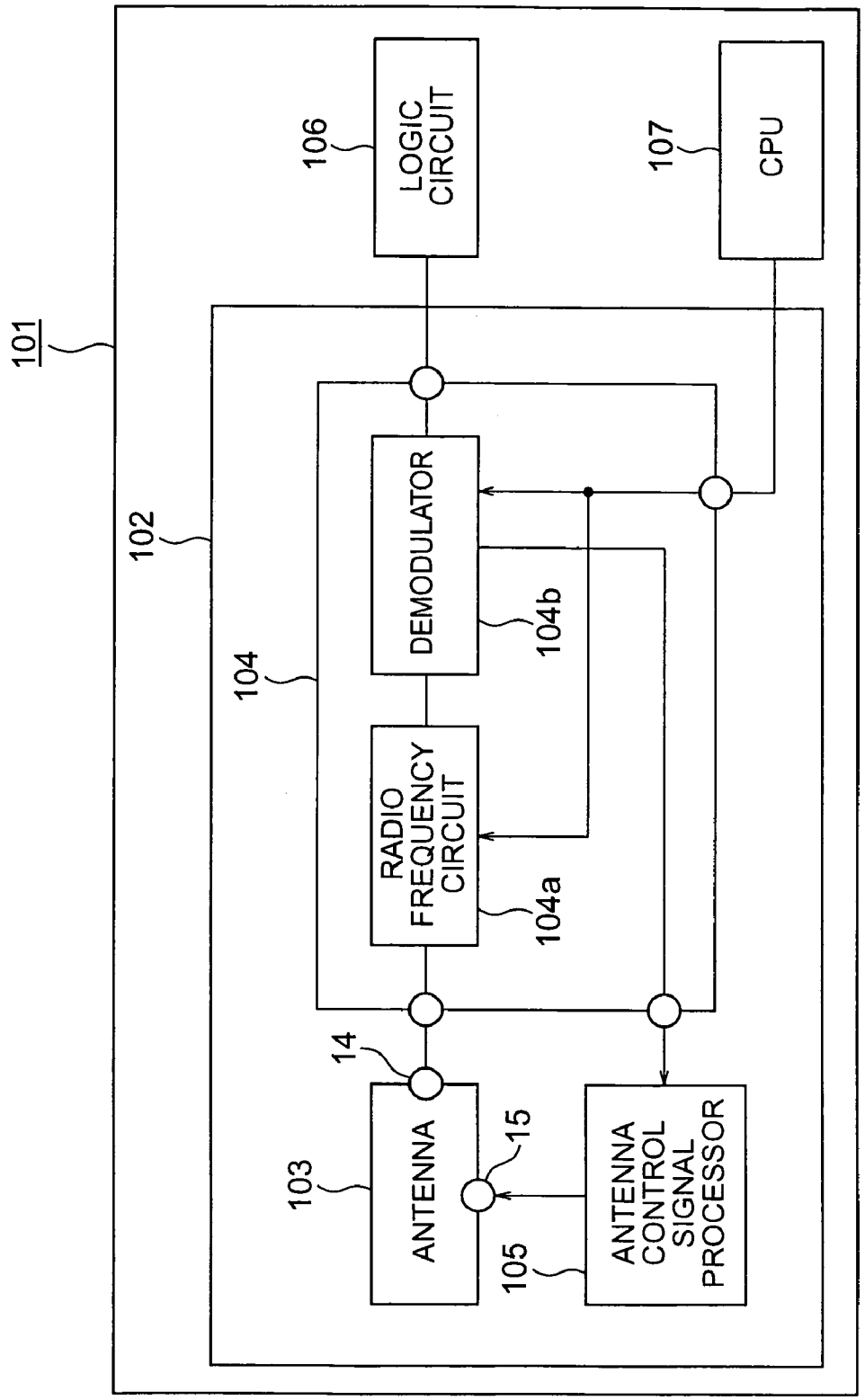
FIG. 8 is a block diagram of a portable terminal according to the sixth embodiment of the invention.

FIG. 8 is a block diagram of a portable terminal according to the sixth embodiment of the invention. Referring to FIG. 8, there are shown a portable terminal 101, a wireless module 102, an antenna 103, a tuner 104, a radio frequency circuit 104a, a demodulator 104b, an antenna control signal processor 105, and a logic circuit 106, a CPU (Central Processing Unit) 107.

The broadcast signals transmitted from broadcast stations are received by the antenna 103 and entered into the tuner 104. The tuner 104 is comprised of the radio frequency circuit 104a and the demodulator 104b. The broadcast signals entered into the tuner 104 are supplied to the radio frequency circuit 104a.

The radio frequency circuit 104a selects a frequency channel desired by the user from the broadcast signals, and produces it as an intermediate-frequency signal that has been controlled to have an amplitude suitable for the operation of the demodulator 104b. The demodulator 104b receives this intermediate frequency signal, makes digital demodulation process and error correction process on this signal, and then produces a digital data signal called the transport stream signal.

The transport stream signal, which has digitally compressed video and audio signals multiplexed, is demultiplexed in the logic circuit 106. After the demultiplexed signals are further subjected to digital expansion process, they undergo the video processing and audio processing, respectively. The resulting video and audio signals are respectively supplied to a monitor and a loudspeaker.

The radio frequency circuit 104a and demodulator 104b within the tuner 104 are controlled to operate by a control signal supplied from the CPU 107 to the tuner 104.

Figure 9:
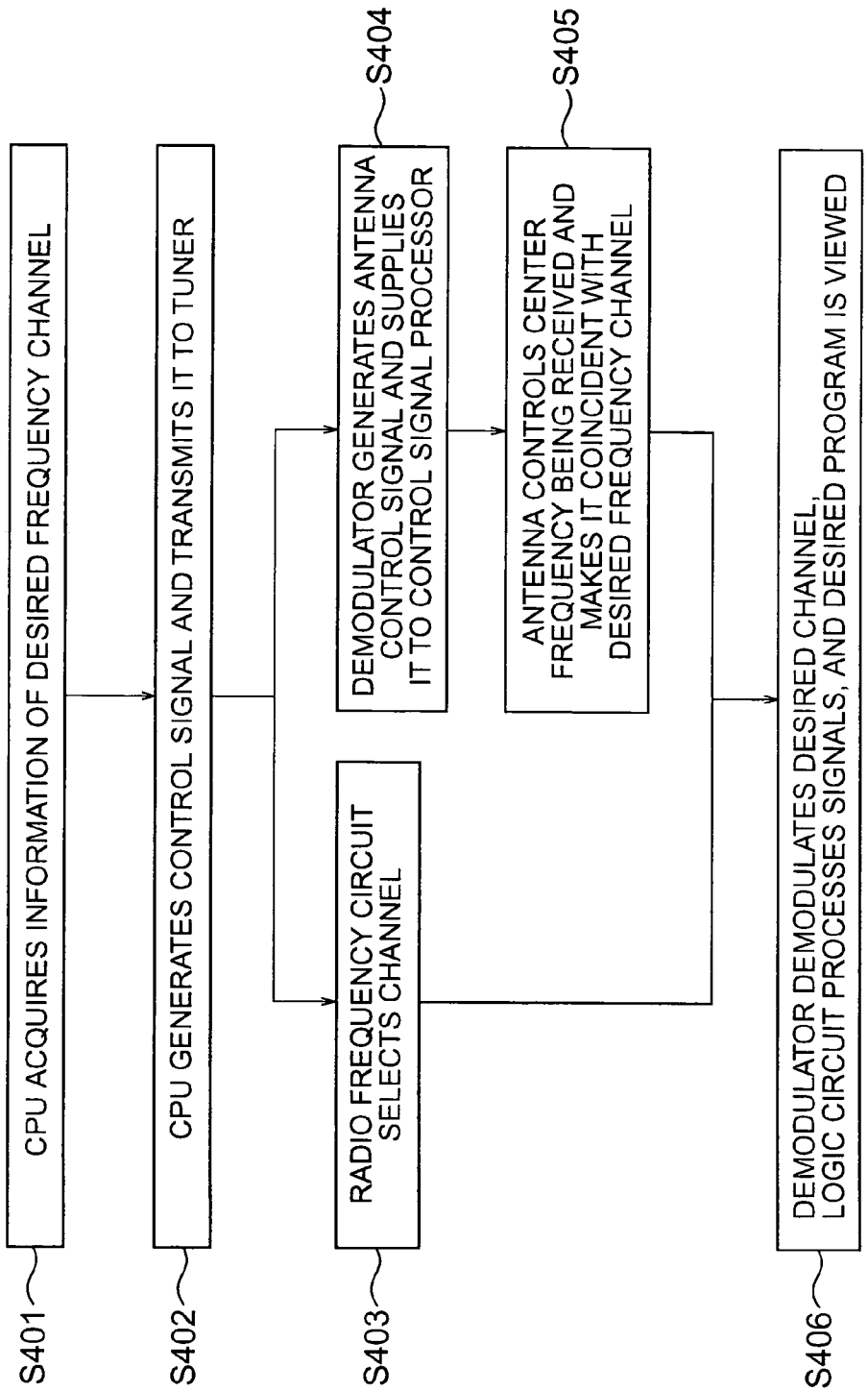
FIG. 9 is a flowchart showing the flow of control when the user changes a channel to another channel to be viewed.

FIG. 9 is a flowchart showing the flow of control for the user to select a desired channel being viewed.

In this embodiment, two different correlation tables are previously provided. For example, one of the tables defines the correlation of the resonant frequencies of the antenna as the center frequencies to be received to the DC voltage values of the antenna control signal, and the other table specifies the correlation of the signals to be produced from the CPU 107 to the desired frequency channels to be received in order to set the antenna control signal that the tuner 104 produces. Then, the CPU 107 causes the resonant frequency of the antenna as the center frequency to be received to coincide with the center frequency of a desired frequency channel together with the channel-selecting operation.

When the user depresses the number button on the portable terminal, the CPU 107 of the portable terminal 101 acquires information of a desired frequency channel (S401). In this case, it is assumed that the CPU 107 has acquired information of channel n as the frequency channel desired by the user.

The CPU 107 uses this information to generate a control signal that is suited to coincide with the desired frequency channel. For example, it produces "Ox041031" as the control signal corresponding to the desired frequency channel. Then, it supplies this control signal to the tuner 104 (S402).

The control signal includes channel selection information. This channel selection information controls the channel-selecting operation of the radio frequency circuit 104a of tuner 104 (S403). Thus, the frequency channel desired by the user is converted to the intermediate frequency signal, which is then supplied to the demodulator 104b.

The control signal produced from the CPU 107 also includes the antenna control signal. This antenna control signal is supplied to the demodulator 104b. The demodulator 104b supplies a DC voltage of, for example, 2.25 V as an antenna control signal to the antenna control signal processor 105 so that the antenna 103 can be controlled by this antenna control signal (S404).

The antenna 103 receives the antenna control signal, for example, a DC voltage from the antenna control signal processor 105 and sets itself so that the resonant frequency as the center frequency to be received can be controlled to coincide with the desired frequency channel, for example, channel n (S405).

On the other hand, the CPU 107 also controls the channel-selecting operation of the tuner 104. Since the tuner 104 makes channel-selecting operation to match channel n in synchronism with the above antenna-controlling operation, the signal received by the antenna 103 can be suitably processed by the tuner 104 and supplied to the logic circuit 106. The logic circuit 106 receives the signal from the tuner 104 and generates the video and audio signals, which are then processed by the following signal processors not shown so that the video and audio signals can be supplied to the monitor and loudspeaker, respectively.

Since the receiving band of the antenna 103 is narrowed, this antenna can be improved in its receiving sensitivity and small-sized as compared with the antenna constructed to receive all the frequency bands. In addition, this antenna can suppress the waves of channels (n−1) and (n+1) and the other signals that interfere with the desired frequency channel, and thus it has an excellent characteristic against the interfering waves.

In addition, the receiving band of the antenna 103 is designed to be narrower than the entire band used in the wireless system and to have a bandwidth necessary to receive the desired frequency channel. Thus, since the frequency bands other than the desired frequency channel can be suppressed, the antenna 103 can supply a desired high-quality signal with less interfering components.

The channel selection information and antenna control information of the control signal to be transmitted from the CPU 107 to the tuner 104 may be transmitted as separate pieces of data. However, if the demodulator 104B generates the antenna control signal by using all or part of the channel selection information, the antenna control information is not necessary to separately transmit. Thus, in this case, the amount of data for the control signal can be reduced.

The antenna 103 is required to control by a continuously changing voltage, but the antenna control signal produced from the tuner 104 is not necessary to be a continuously changing voltage. It may be a PWM (Pulse Wave Modulation) signal. In this case, the antenna control signal processor provided outside the tuner 104 needs a low-pass filter to convert the PWM signal to the continuously changing voltage before it is supplied to the antenna 103.

As another method for applying a voltage to the antenna, it can be considered to supply a digital signal of a plurality of bits. In this case, the antenna control signal processor 105 needs a DA (Digital to Analog) converter circuit by which the antenna control signal fed as the digital signal is converted to the continuously changing voltage as an analog signal.

Since the selection of a received frequency by the antenna according to the antenna control signal is necessary to interlock the channel-selecting operation of the radio frequency circuit 104a, the demodulator 104b generates the antenna control signal according to the control signal fed from the CPU 107 to the tuner 104.

When the radio frequency circuit 104a has the function to produce the antenna control signal, it may produce the antenna control signal under the control of the CPU 107.

Although the CPU 107 could directly produce the antenna control signal, the CPU 107 may control the tuner 104 so that the tuner 104 produces the antenna control signal. Thus, since the antenna signal can be produced from the tuner 104 provided nearer to the antenna 103, it is possible to transmit the antenna control signal along a shorter-distance path.

The result is that the antenna control signal can be prevented from being deteriorated due to leaking of noise into the antenna control signal. Thus, the antenna can be prevented from being erroneously controlled.

While the antenna control signal processor 105 is provided outside the tuner 104 in this embodiment, the antenna control signal processor 105 may be provided within the tuner 104.

In this case, since the antenna control signal processor 105 is not incorporated near the antenna 103, the circuit arrangement on the antenna 103 side can be small-sized when the antenna 103 is provided away from the tuner 104. Thus, the antenna 103 itself can be small-sized.

Figure 10:
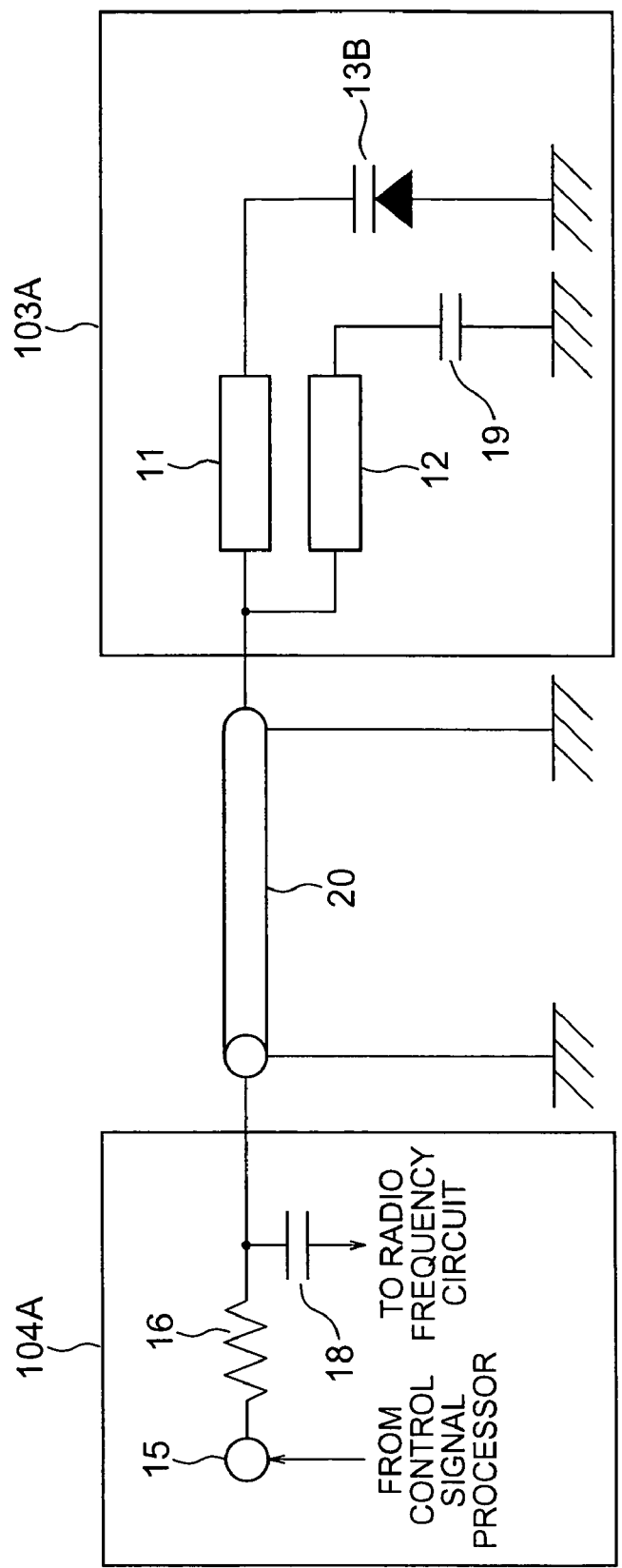
FIG. 10 is a diagram showing the construction of a wireless unit according to the seventh embodiment of the invention.

FIG. 10 is a diagram showing the construction of a wireless unit according to the seventh embodiment of the invention. As illustrated in FIG. 10, the wireless unit has an antenna 103A, a tuner 104A and a coaxial cable 20 that connects the antenna and tuner.

The antenna 103A is comprised of the transmission lines 11 and 12 and the variable capacitance diode 13B. The variable capacitance diode 13B has its anode electrically grounded and its cathode connected to one end of the transmission line 11. The other end of the transmission line 11 is connected to one end of the transmission line 12, and the other end of the transmission line 12 is electrically grounded through the capacitor 19. The junction between the transmission lines 11 and 12 is connected to one end of the inner conductor of the coaxial cable 20.

The resistor 16 of the tuner 104A has its one end connected to the other end of the inner conductor of the coaxial cable 20 and its other end connected to the control signal input terminal 15. In addition, one end of the capacitor 18 is connected to the other end of the inner conductor of the coaxial cable 20. The other end of the capacitor 18 is connected to the radio frequency circuit not shown.

The DC reverse voltage supplied from the control signal input terminal 15 controls the capacitance value of the variable capacitance diode 13B, and this capacitance value controls the resonant frequency.

In this embodiment, in addition to the various effects described with reference to FIG. 1, the antenna 103A and tuner 104A are connected by the coaxial cable 20, and thus the antenna 103A and tuner 104A can be separately disposed with a distance kept between them. Therefore, the design freedom can be increased.

Figure 11:
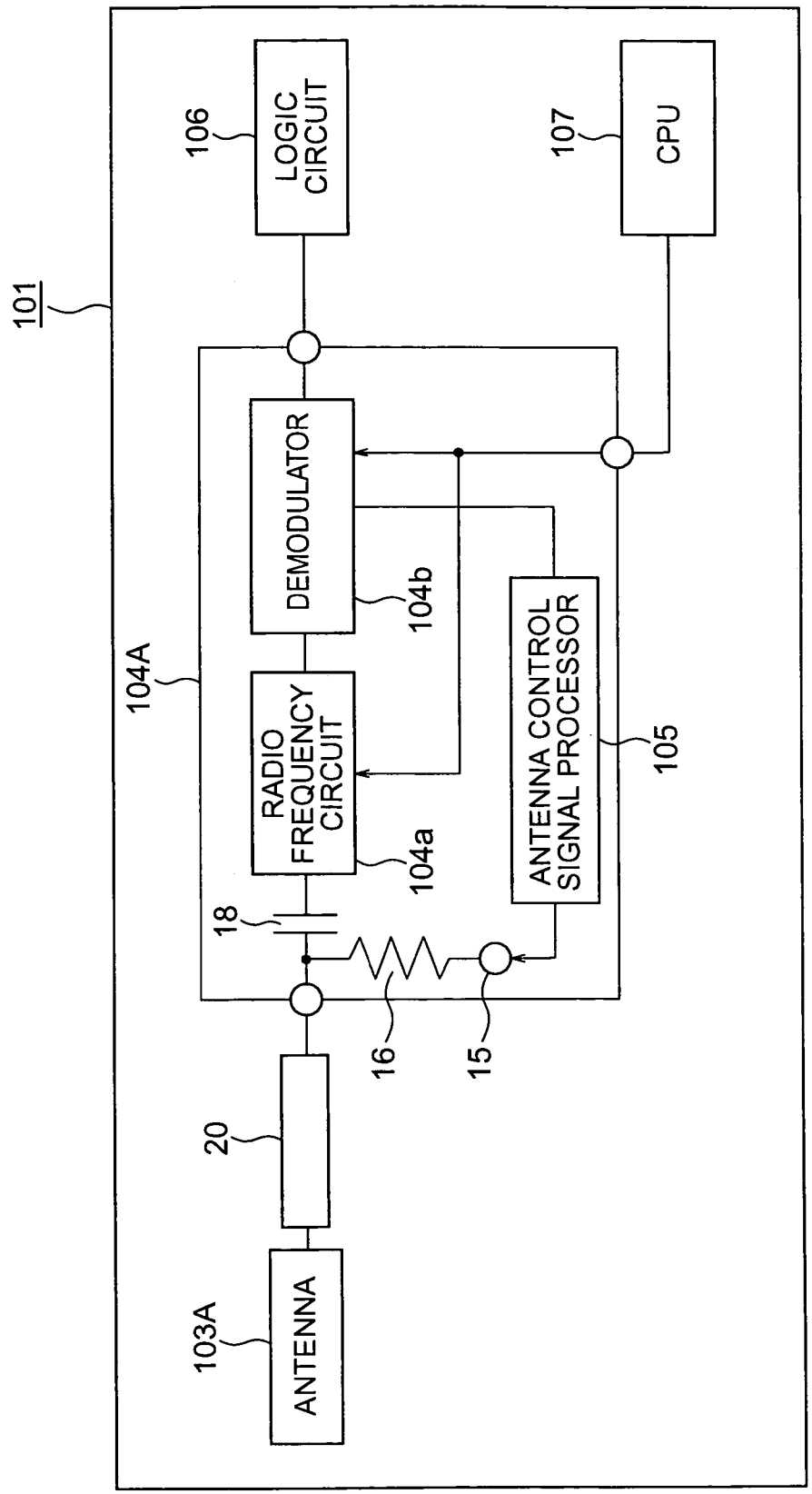
FIG. 11 is a block diagram of a portable terminal according to the eighth embodiment of the invention.

FIG. 11 is a block diagram of a portable terminal according to the eighth embodiment of the invention. In FIG. 11, like elements corresponding to those in FIG. 10 are identified by the same reference numerals.

In this embodiment, the antenna control signal produced within the tuner 104A is superimposed on the radio frequency signal line to which the received signal is transmitted from the antenna 103.

The tuner 104A needs the circuit arrangement that causes the antenna control signal to be superimposed on the radio frequency signal line, and the antenna 103A needs the circuit arrangement that extracts the antenna control signal from the radio frequency signal line. In this embodiment, only a single signal line is provided as compared with the case where the two signal lines of radio frequency signal line and antenna control signal line are provided between the tuner 104 and antenna 103 as in the embodiment of FIG. 8 that has the antenna shown in FIGS. 6 and 7.

The radio frequency signal line is generally a coaxial cable that is excellent in its resistance to noise. Thus, the antenna can be controlled without erroneous operation because the noise to the antenna control signal is not mixed into the cable. In addition, it is also possible to reduce unnecessary spaces within the portable terminal. This embodiment is effective particularly when the tuner 104A and antenna 103A are provided separately away from each other.

Figure 12:
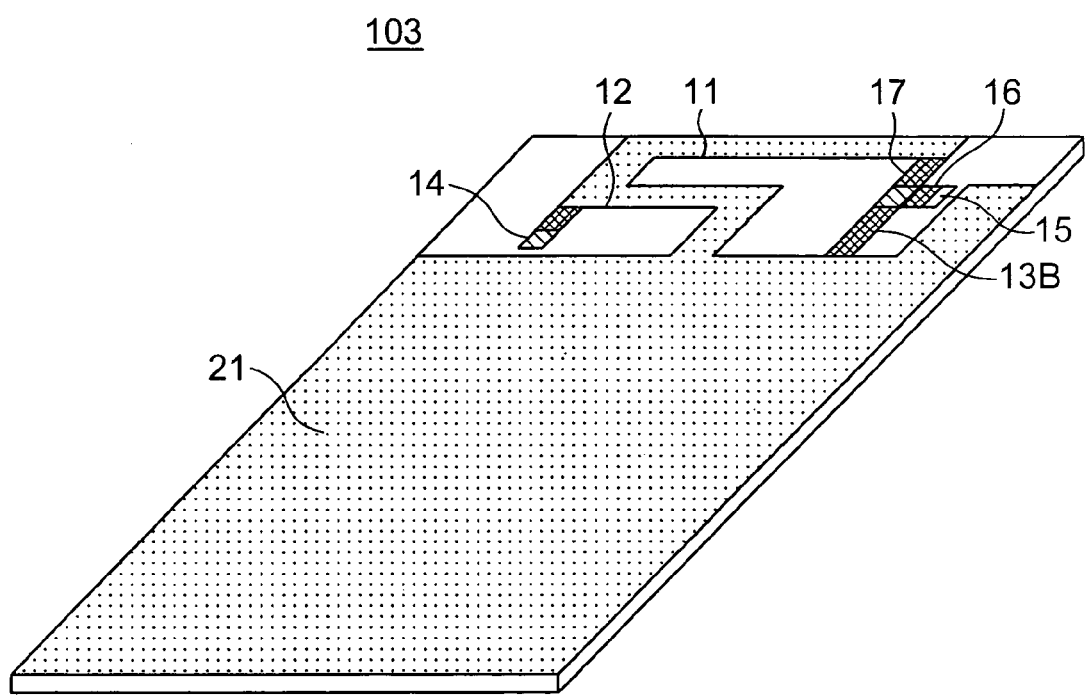
FIG. 12 is a diagram showing the structure of an antenna according to the ninth embodiment of the invention.

FIG. 12 is a diagram showing the structure of the antenna 103 according to the ninth embodiment of the invention. As illustrated in FIG. 12, the antenna having the structure shown in FIG. 6 is actually formed on the printed circuit board within a mobile communication terminal such as a cellphone or PDA.

In this embodiment, the transmission line 12 is integrally formed on the printed circuit board 21, and the transmission line 11 is formed integral with the transmission line 12. The junction of the transmission lines 11 and 12 is connected to the feed point 14. The opposite end of the transmission line 11 to the junction between the transmission lines 11 and 12 is connected to one end of the capacitor 17 mounted on the printed circuit board 21. The other end of the capacitor 17 is connected to the cathode of the variable capacitance diode 13B mounted on the printed circuit board 21. The anode of the variable capacitance diode 13B is electrically grounded, and the junction between the cathode of the variable capacitance diode 13B and the capacitor 17 is connected through the resistor 16 to the control signal input terminal 15.

According to this embodiment, in addition to the various effects mentioned with reference to FIGS. 1 and 6, the cost can be decreased as compared with the case in which the antenna 103 is provided independently of the printed circuit board 21.

Figure 13:
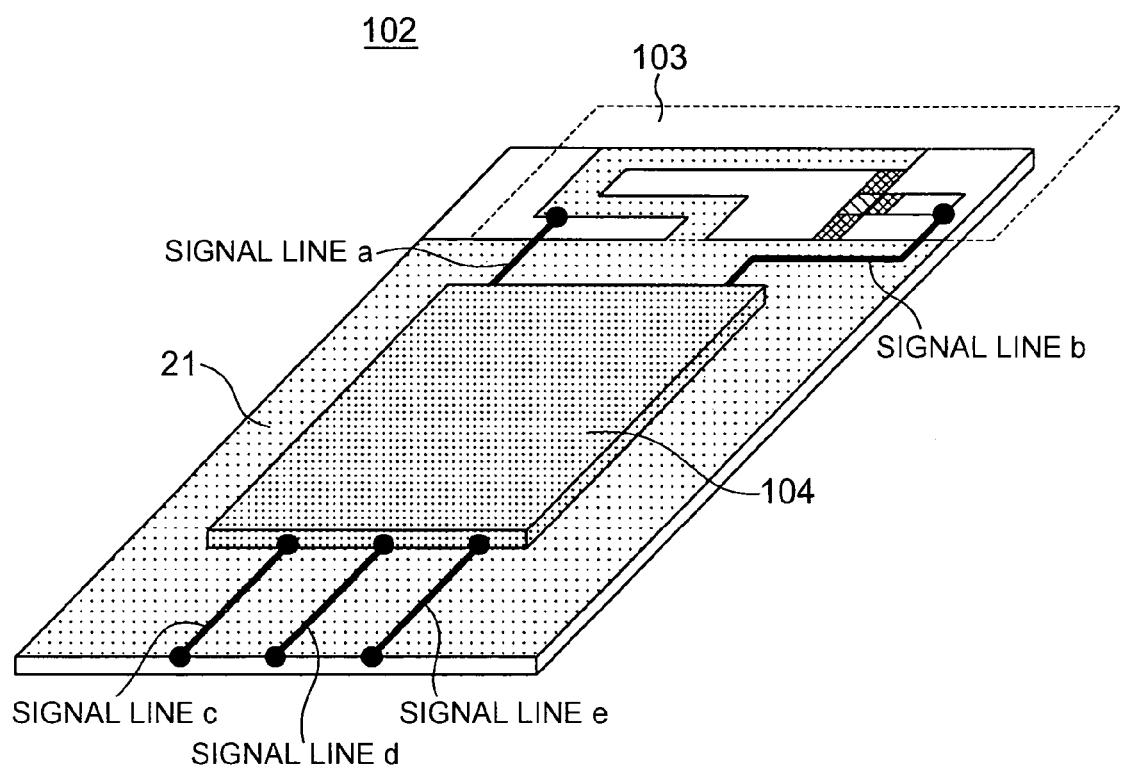
FIG. 13 is a diagram showing the construction of a receiving module according to the tenth embodiment of the invention.

FIG. 13 is a diagram showing the construction of the receiving module 102 according to the tenth embodiment of the invention.

In this embodiment, the antenna 103 is formed on the printed circuit board 21, and the tuner 104 is mounted on the printed circuit board 21. This tuner 104 demodulates the signal fed through a signal line a from the antenna 103 and sends the demodulated signal to the external signal processor (not shown) via a signal line e. In addition, the control signal supplied through a signal line c from the CPU not shown is used to determine the DC voltage that is used to control the variable capacitance diode of the antenna 103, and this DC voltage is supplied through a signal line b. Moreover, the signal line d is connected to the power supply.

According to this embodiment, the printed circuit board 21 and antenna 103 can be simultaneously formed, and thus the cost can be reduced as compared with the case where the printed circuit board 21 and antenna 103 are formed independently of each other.

Figure 14:
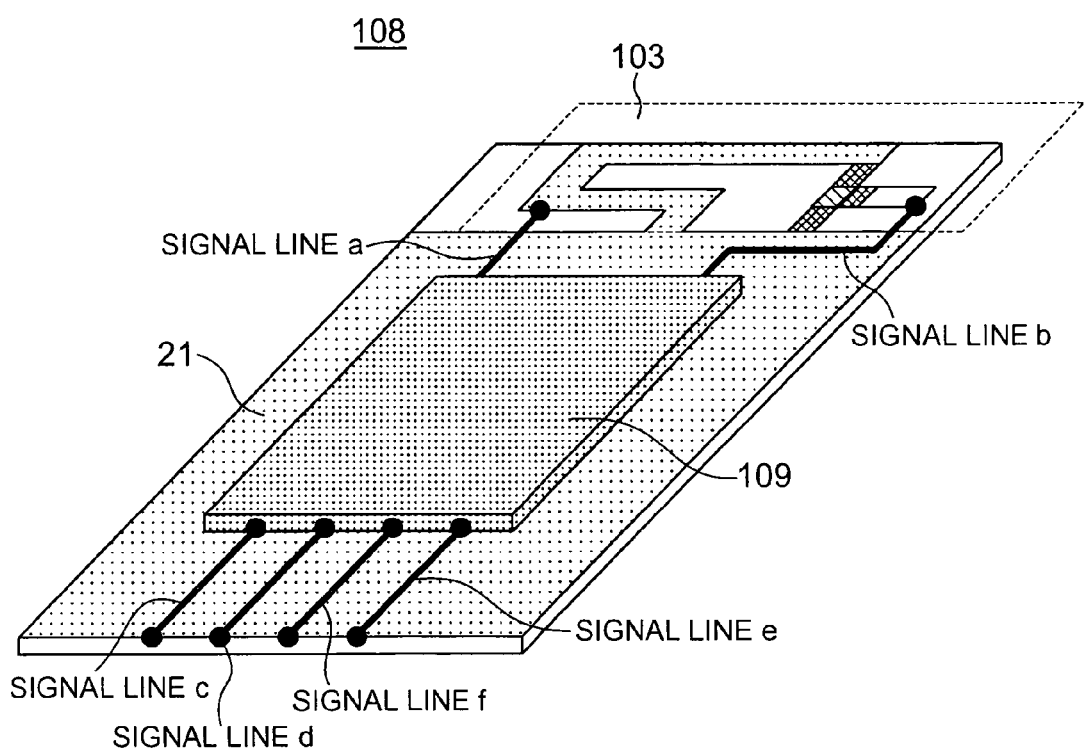
FIG. 14 is a diagram showing an example of the construction of a transmitting and receiving module according to the eleventh embodiment of the invention.

FIG. 14 is a diagram showing an example of the construction of the transmitting and receiving module 108 according to the eleventh embodiment of the invention.

In this embodiment, the printed circuit board 21 and antenna 103 are integrally formed, and the transmitting and receiving circuit 109 is mounted on the printed circuit board 21. This transmitting and receiving circuit 109 demodulates the signal that is received from the antenna and fed through the signal line a, and supplies the demodulated signal to the outside through the signal line e. In addition, the transmitting and receiving circuit 109 modulates the transmitting signal received through the signal line f, and supplies the modulated signal to the antenna through the signal line a. The control signal received through the signal line c is used to determine the DC voltage that is used to control the variable capacitance diode 13B of the antenna 103. The DC voltage is supplied through the signal line b. In addition, the signal line d is connected to the power supply.

According to this embodiment, the printed circuit board 21 and antenna 103 can be simultaneously formed, and thus the cost can be decreased as compared with the case where the printed circuit board 21 and antenna 103 are formed independently of each other.

Figure 15:
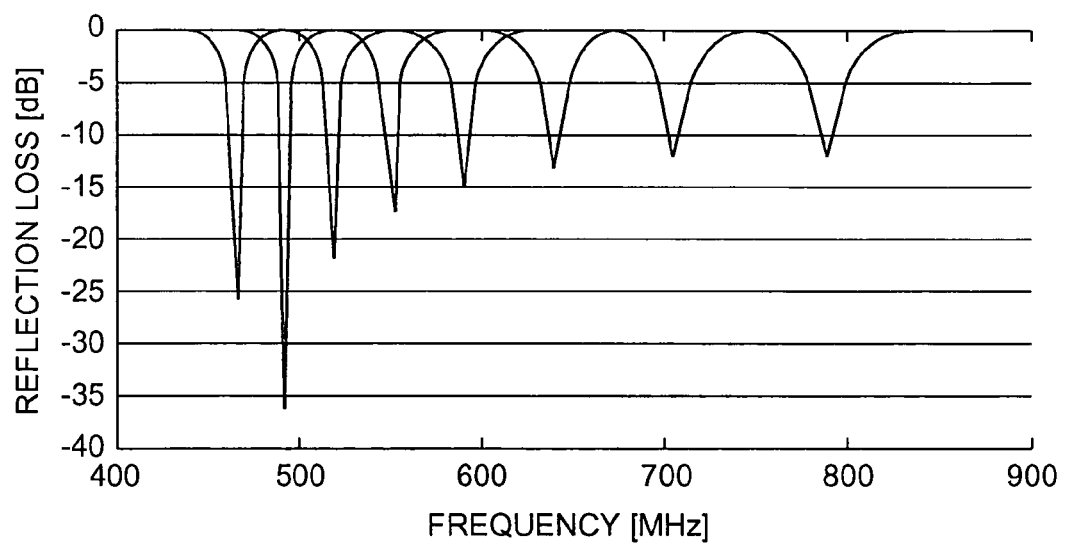
FIG. 15 is a diagram showing a frequency characteristic of reflection loss obtained by simulating the reflection loss of the antenna of the receiving module shown in FIG. 13.

FIG. 15 is a diagram showing characteristic curves of the simulated reflection loss of the antenna in the receiving module 102 shown in FIG. 13. It can be confirmed that the resonant frequency of the antenna is shifted from the left to the right with the change of the capacitance value of the variable capacitance diode 13B of the antenna. Thus, this antenna can cover the entire UHF band from 470 MHz to 770 MHz.

Figure 16:
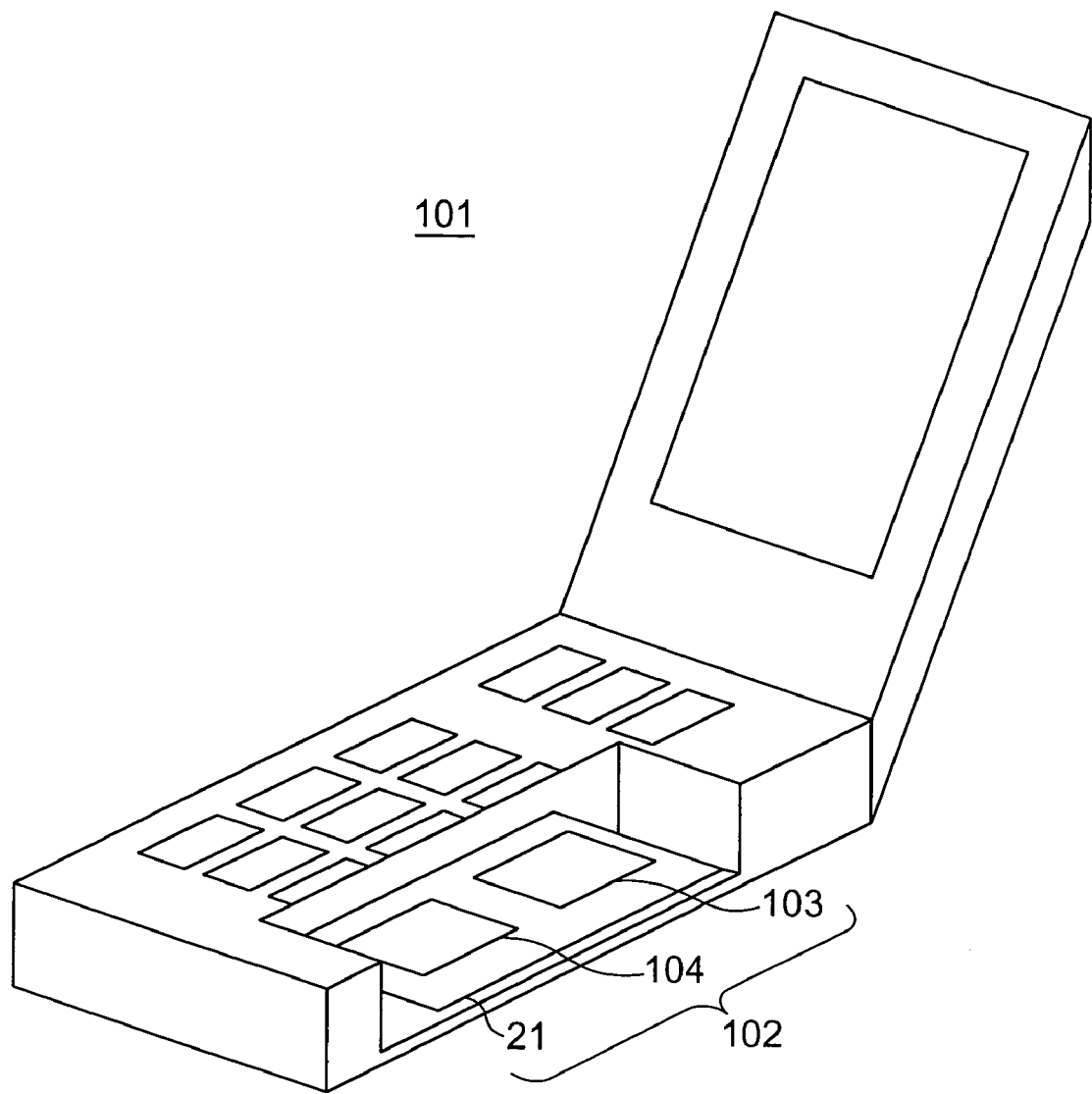
FIG. 16 is a diagram showing the external appearance of a portable terminal having the receiving module of FIG. 13 built in as the portable terminal according to the twelfth embodiment of the invention.

FIG. 16 is a diagram showing the external appearance of the portable terminal 101 having the receiving module 102 of FIG. 13 incorporated according to the twelfth embodiment of the invention.

According to this embodiment, the portable terminal can be small-sized, and it is possible to publicly receive the digital terrestrial broadcasting.

Figure 17:
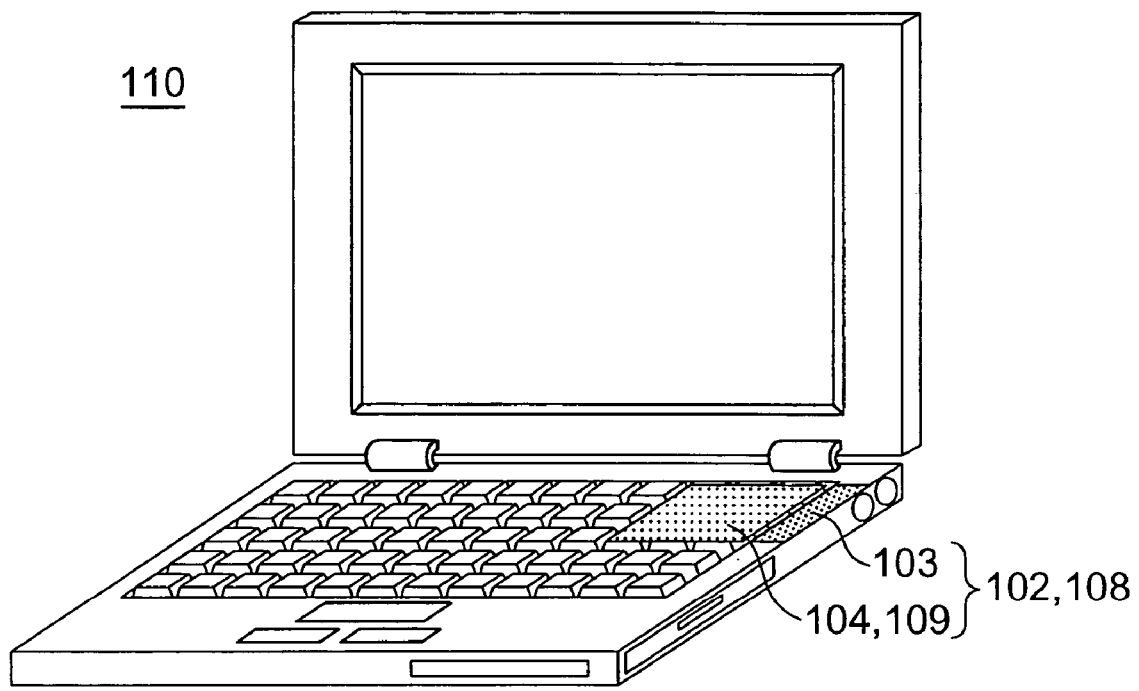
FIG. 17 is a diagram showing the external appearance of a notebook computer having the receiving module of FIG. 13 or 14 built in as the personal computer according to the thirteenth embodiment of the invention.

FIG. 17 is a diagram showing the external appearance of the notebook computer 110 having the receiving module 102 of FIG. 13 or FIG. 14 incorporated according to the thirteenth embodiment of the invention.

According to this embodiment, since the antenna 103 and transmitting and receiving module 104 or 107 are built in the housing, the notebook computer 110 can receive or transmit radio waves without being disfigured.

Figure 18:
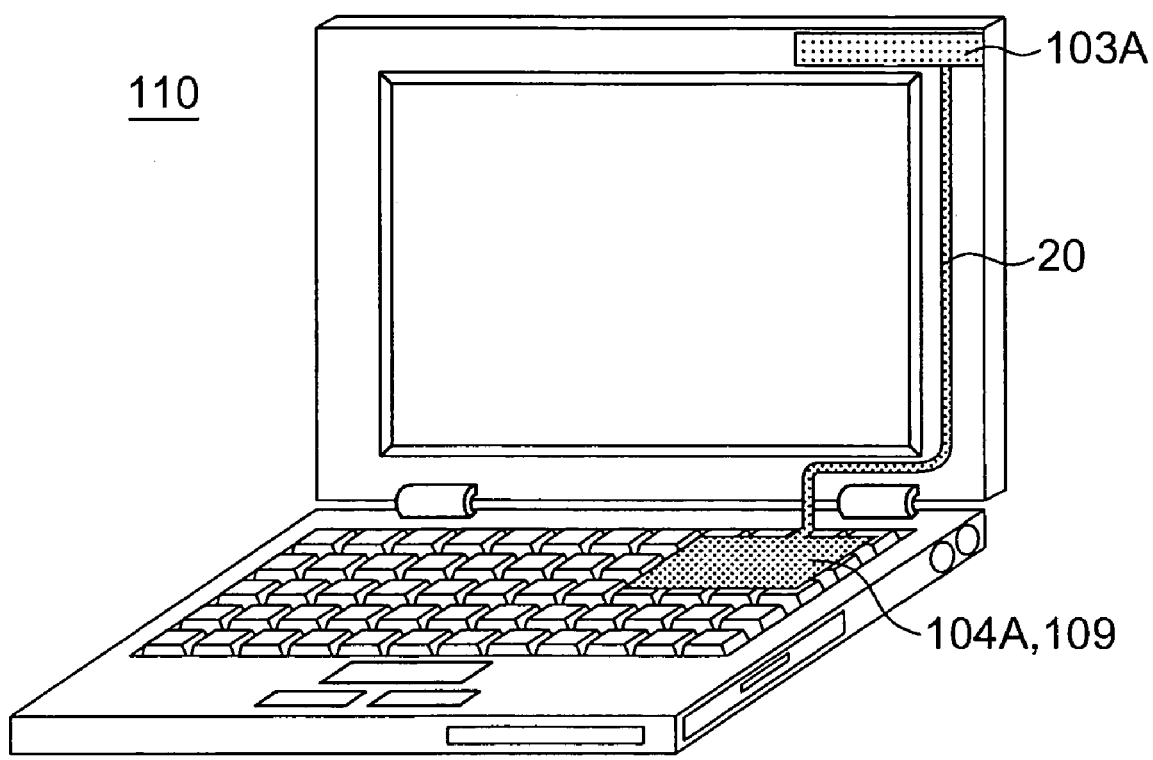
FIG. 18 is a diagram showing the external appearance of a notebook computer according to the fourteenth embodiment of the invention.

FIG. 18 is a diagram showing the external appearance of the notebook computer 110 according to the fourteenth embodiment of the invention, this notebook computer having incorporated therein the receiving unit of FIG. 10 or the transmitting and receiving module 108 with the transmitting and receiving circuit 109 of FIG. 14 used in place of the receiving circuit 104A.

According to this embodiment, the coaxial cable 21 enables the antenna 103A to be provided at a distance away from the receiving circuit 104A or transmitting and receiving circuit 109, thus increasing the design freedom. In addition, since the receiving circuit 104 or the transmitting and receiving circuit 107 and the antenna 103A are built in the housing, the notebook computer 110 can receive and transmit radio waves without being disfigured.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A wireless module comprising:
an antenna comprising:
a transmission line; and
a variable capacitance unit configured to control a resonant frequency of the antenna;
a transmitting and/or receiving circuit, wherein said transmitting circuit and/or receiving circuit includes a circuit for producing an antenna control signal,
wherein:
a central processing unit external to said wireless module controls said transmitting circuit and/or receiving circuit to set the frequency of a radio signal transmitted/received from said transmitting circuit and/or receiving circuit through said antenna,
said central processing unit controls said transmitting circuit and/or receiving circuit to produce said antenna control signal that controls the resonant frequency of said antenna for transmitting/receiving the radio signal through the antenna, and
said frequency of said radio signal that said transmitting circuit and/or receiving circuit transmits/receives and said resonant frequency of said antenna for transmitting/receiving the radio signal through the antenna are controlled in conjunction with each other.

2. A wireless module according to claim 1, wherein the frequency band of a radio signal transmitted/received by said antenna is narrower than the entire frequency band to be used in a wireless system that transmits/receives through said antenna, and said central processing unit causes the resonant frequency of said antenna to change when said radio signal is transmitted/received, thus enabling said wireless system to transmit/receive said radio signal over said entire frequency band.

3. A wireless apparatus comprising:
a wireless module including:
an antenna comprising:
a transmission line; and
a variable capacitance unit configured to control a resonant frequency of the antenna;
and
a transmitting and/or receiving circuit, wherein said transmitting circuit and/or receiving circuit includes a circuit for producing an antenna control signal;
and
a central processing unit external to said wireless module;
wherein:
the central processing unit controls said transmitting circuit and/or receiving circuit to set the frequency of a radio signal transmitted/received from said transmitting circuit and/or receiving circuit through said antenna,
said central processing unit controls said transmitting circuit and/or receiving circuit to produce said antenna control signal that controls the resonant frequency of said antenna for transmitting/receiving the radio signal through the antenna, and
said frequency of said radio signal that said transmitting circuit and/or receiving circuit transmits/receives and said resonant frequency of said antenna for transmitting/receiving the radio signal through the antenna are controlled in conjunction with each other.

4. A wireless apparatus having a wireless module incorporated, said module having at least an antenna, a transmitting circuit and/or receiving circuit and a central processing unit, wherein
said antenna includes:
a transmission line; and
a variable capacitance unit configured to control a resonant frequency of the antenna
said transmitting circuit and/or receiving circuit includes a circuit for producing an antenna control signal,
said central processing unit controls said transmitting circuit and/or receiving circuit to set the frequency of a radio signal that said transmitting circuit and/or receiving circuit transmits/receives through said antenna,
said central processing unit controls said transmitting and/or receiving circuit to produce said antenna control signal which controls the resonant frequency of said antenna to said transmitting signal/receive signal, and
the frequency of said radio signal that said transmitting circuit and/or receiving circuit transmits/receives and the resonant frequency of said antenna to said transmitting signal/received signal are controlled in conjunction with each other.

5. A wireless apparatus according to claim 4, wherein the frequency band of said radio signal that said antenna transmits/receives is narrower than the entire frequency band used in a wireless system that transmits/receives through said antenna, and said central processing unit causes the resonant frequency of said antenna to transmitted/received signal to change, thus enabling said wireless system to transmit/receive over said entire frequency band used.

* * * * *